United States Patent
Okumura et al.

(10) Patent No.: US 9,752,038 B2
(45) Date of Patent: Sep. 5, 2017

(54) WATER-BASED INK FOR INK-JET RECORDING, AND INK-JET RECORDING METHOD

(71) Applicant: Brother Kogyo Kabushiki Kaisha, Nagoya-shi, Aichi-ken (JP)

(72) Inventors: Yuki Okumura, Ichinomiya (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 105 days.

(21) Appl. No.: 14/867,747

(22) Filed: Sep. 28, 2015

(65) Prior Publication Data

US 2016/0289470 A1    Oct. 6, 2016

(30) Foreign Application Priority Data

Mar. 31, 2015   (JP) .................................. 2015-073804

(51) Int. Cl.
| | | |
|---|---|---|
| C09D 11/322 | (2014.01) | |
| C09D 11/00 | (2014.01) | |
| C09D 11/30 | (2014.01) | |
| C09D 11/38 | (2014.01) | |

(52) U.S. Cl.
CPC ............ *C09D 11/322* (2013.01); *C09D 11/00* (2013.01); *C09D 11/30* (2013.01); *C09D 11/38* (2013.01)

(58) Field of Classification Search
CPC .............................. C09D 11/322; C09D 11/38
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 7,819,962 B2 | 10/2010 | Gu | |
| 7,922,805 B2 | 4/2011 | Kowalski et al. | |
| 8,016,404 B2 | 9/2011 | Kato et al. | |
| 8,343,268 B2 * | 1/2013 | Ma ......................... | C09D 11/40 106/31.37 |
| 8,784,549 B2 * | 7/2014 | Bermel ................ | C09D 11/322 106/31.6 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |

(Continued)

FOREIGN PATENT DOCUMENTS

| | | |
|---|---|---|
| JP | H08-3498 A | 1/1996 |
| JP | 2000-513396 A | 10/2000 |

(Continued)

OTHER PUBLICATIONS

Dated Jun. 27, 2016—(EP) Extended European Search Report—App 15187206.6.

*Primary Examiner* — Veronica F Faison
(74) *Attorney, Agent, or Firm* — Banner & Witcoff, Ltd.

(57) ABSTRACT

There is provided a water-based ink for ink-jet recording containing: a pigment; a surfactant; and water, wherein dynamic surface tension of the water-based ink measured under a condition of temperature of 25 degrees Celsius and lifetime of 10 ms is not less than 35 mN/m; and dynamic surface tension of the water-based ink measured under a condition of temperature of 25 degrees Celsius and lifetime of 50 ms is not more than 34.5 mN/m.

21 Claims, 1 Drawing Sheet

(56) References Cited

U.S. PATENT DOCUMENTS

| | | | |
|---|---|---|---|
| 2009/0169761 A1 | 7/2009 | Szajewski et al. | |
| 2009/0229489 A1 | 9/2009 | Gu | |
| 2011/0048278 A1* | 3/2011 | Kiyomoto | C09D 11/322 |
| | | | 106/31.86 |
| 2014/0292901 A1 | 10/2014 | Ohishi | |

FOREIGN PATENT DOCUMENTS

| | | |
|---|---|---|
| JP | 2004-231711 A | 8/2004 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2015-007204 A | 1/2015 |

* cited by examiner

WATER-BASED INK FOR INK-JET RECORDING, AND INK-JET RECORDING METHOD

CROSS REFERENCE TO RELATED APPLICATION

The present application claims priority from Japanese Patent Application No. 2015-073804, filed on Mar. 31, 2015, the disclosure of which is incorporated herein by reference in its entirety.

BACKGROUND OF THE INVENTION

Field of the Invention

The present invention relates to a water-based ink for ink-jet recording, an ink cartridge, an ink-jet recording apparatus, and an ink-jet recording method.

Description of the Related Art

As an ink usable for ink-jet recording, there is proposed a water-based pigment ink containing a pigment and water (see, for example, Japanese Patent Application Laid-open No. 2004-231711).

It is important that in the above-described water-based pigment ink, any increase in the viscosity and any solidification due to drying of the water-based pigment ink are suppressed so as to prevent any delay in discharge of the ink from occurring for the purpose of realizing a stable discharge (jetting) of the water-based pigment ink. Further, the water-based pigment ink is required to have an improved image quality. In view of this situation, an object of the present teaching is to provide a water-based pigment ink for ink-jet recording in which the increase in viscosity and the solidification due to the drying of the water-based pigment ink are suppressed, the delay in discharge of the ink is hardly occurs, and the image quality is also improved.

SUMMARY OF THE INVENTION

According to a first aspect of the present teaching, there is provided a water-based ink for ink-jet recording including:

a pigment;

a surfactant; and water, wherein dynamic surface tension of the water-based ink measured under a condition of temperature of 25 degrees Celsius and lifetime of 10 ms is not less than 35 mN/m; and dynamic surface tension of the water-based ink measured under a condition of temperature of 25 degrees Celsius and lifetime of 50 ms is not more than 34.5 mN/m.

According to a second aspect of the present teaching, there is provided an ink-jet recording method including:

preparing a water-based ink for ink-jet recording which contains a pigment, a surfactant and water, wherein dynamic surface tension of the water-based ink measured under a condition of temperature of 25 degrees Celsius and lifetime of 10 ms is not less than 35 mN/m, and dynamic surface tension of the water-based ink measured under a condition of temperature of 25 degrees Celsius and lifetime of 50 ms is not more than 34.5 mN/m; and discharging, to a recording medium, the water-based ink by an ink-jet system.

DESCRIPTION OF THE PREFERRED EMBODIMENTS

Figure 1:
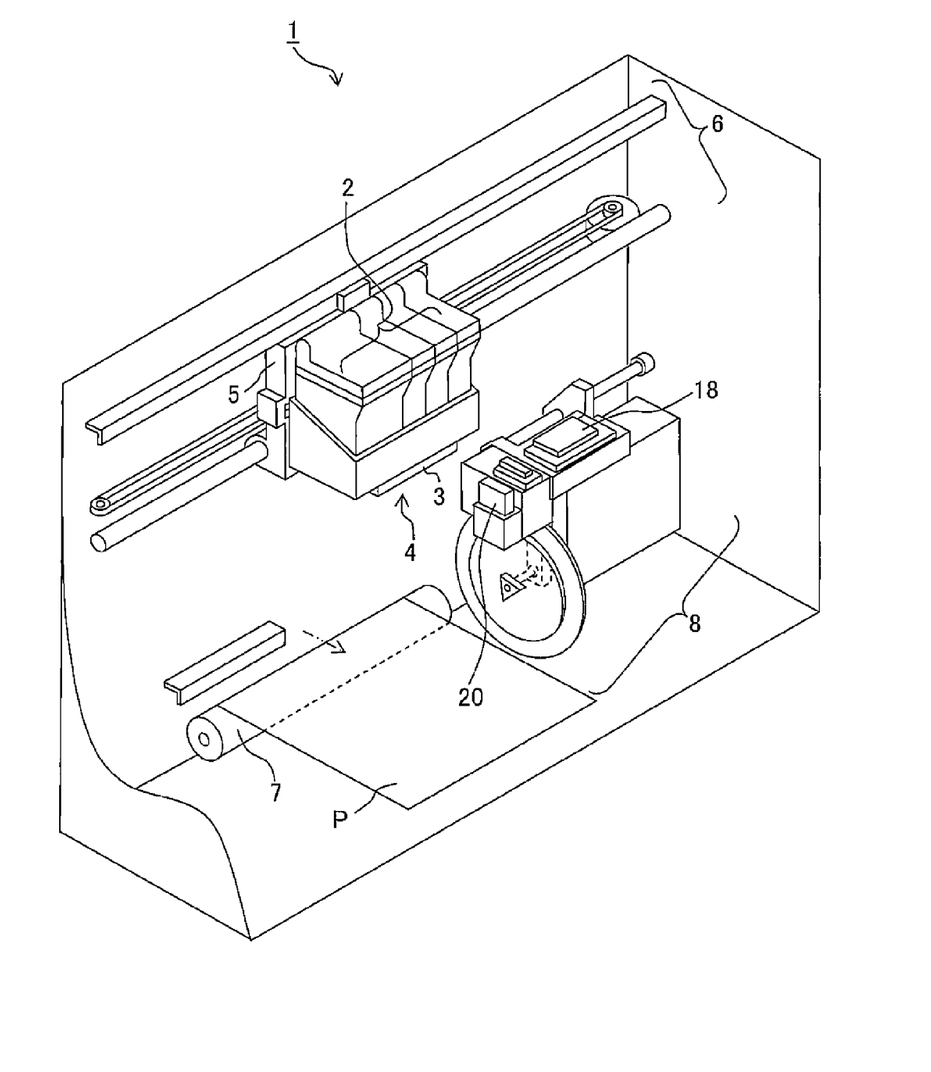
FIGURE is a schematic perspective view depicting an example of the configuration of an ink-jet recording apparatus of the present teaching.

An explanation will be given about a water-based ink for ink-jet recording of the present teaching. In the following, the water-based ink for ink-jet recording is also referred as "water-based ink" or "ink" in some cases. The water-based ink of the present teaching includes a pigment, a surfactant, and water.

In the present teaching, the pigment is not particularly limited and includes, for example, carbon black, an inorganic pigment, an organic pigment, etc. The carbon black includes, for example, furnace black, lamp black, acetylene black, channel black, etc. The inorganic pigment includes, for example, titanium oxide, inorganic pigments based on iron oxide, inorganic pigments based on carbon black, etc. The organic pigment includes, for example, azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment, etc.; nitro pigments; nitroso pigments; aniline black daylight fluorescent pigment; and the like. Any other pigment is also usable provided that the pigment is dispersible in a water phase (aqueous phase). Specific example of the pigments as described above include, for example, C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violet 19 and 196; C. I. Pigment Blues 1, 2, 3, 15, 15:1, 15:2, 15:3, 15:4, 16, 22, and 60; C. I. Pigment Greens 7 and 36; solid solutions of the above-listed pigments; and the like. The water-based ink of the present teaching may be prepared by dispersing the pigment in water with a dispersant. As the dispersant, it is allowable to use, for example, any general polymeric dispersant, etc. Alternatively, in the water-based ink of the present teaching, the pigment may be subjected to polymer capsulation.

The pigment may be a self-dispersible pigment. The self-dispersible pigment is dispersible in water without using any dispersant, for example, owing to the fact that at least one of the hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the pigment particles by the chemical bond directly or with any group intervening therebetween. It is possible to use self-dispersible pigments subjected to the surface treatment by any one of methods described, for example, in Japanese Patent Application Laid-open No. HEIS-3498 (corresponding to U.S. Pat. No. 5,609,671) and Published Japanese Translation of PCT International Publication for Patent Application No. 2000-513396 (corresponding to U.S. Pat. No. 5,837,045), Published Japanese Trans- lation of PCT International Publication for Patent Application No. 2008-524400 (corresponding to United States Patent Application Publication No. US 2006/0201380), Published Japanese Translation of PCT International Publication for Patent Application No. 2009-515007 (corresponding to United States Patent Application Publications No. US 2007/0100023 and No. US 2007/0100024), Published Japanese Translation of PCT International Publication for Patent Application No. 2011-515535 (corresponding to United States Patent Application Publications No. US 2009/0229489), etc. It is possible to use, as a material for the self-dispersible pigment, either one of the inorganic pigment and the organic pigment. Further, a pigment which is suitable for the above-described treatment includes, for example, carbon black such as "MA8" and "MA100" produced by Mitsubishi Chemical Corporation, etc. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; "LIOJET (trade name) WD BLACK 002C" produced by Toyo Ink Mfg. Co., Ltd.; and the like.

The solid content blending amount of the pigment (pigment solid content amount) in the entire amount of the water-based ink is not particularly limited, and may be appropriately determined based on, for example, desired optical density or color (hue, tint), etc. The pigment solid content amount is, for example, in a range of 0.1% by weight to 20% by weight, is preferably in a range of 6% by weight to 10% by weight, and is more preferably in a range of 7% by weight to 9% by weight. As the solid content blending amount of the pigment is greater, higher optical density (OD value) can be obtained. On the other hand, in such a case, the increase in viscosity and the solidification due to the drying tend to occur more easily, as well. However, according to the present teaching, it is possible to suppress the increase in viscosity and the solidification due to the drying can be suppressed and to make any delaying in discharge (jetting or recording) to hardly occur, without any dependence on the solid content blending amount of the pigment. Further, the average particle size of the pigment is not particularly limited, and the average particle size of the pigment can be selected appropriately depending on an intended purpose. The average particle size is, for example, in a range of 100 nm to 200 nm, preferably in a range of 140 nm to 170 nm in view of realizing an improved image quality (optical density or OD value). The average particle size can be calculated, for example, by diluting the pigment so that the solid content blending amount of the pigment is 0.02% by weight and then by using a dynamic light scattering particle size distribution measuring apparatus LB-550 manufactured by HORIBA, Ltd. so as to obtain the intensity of scattered light as the reference for the average particle size.

From the viewpoint of preventing any delay in discharge of the ink from occurring, and of obtaining high optical density (OD value), the pigment is preferably a self-dispersible pigment, and more preferably is a self-dispersible pigment modified by a carboxyl group. Further, in a case that the water-based ink contains the self-dispersible pigment, preferably contains the self-dispersible pigment modified by the carboxyl group in a large blending amount, for example, in a range of 7% by weight to 9% by weight, it is possible to obtain height optical density (OD value). The water-based ink may contain another colorant such as a dye, etc., in addition to the pigment; alternatively, it is allowable that the water-based ink contains no other colorant different from the pigment.

The surfactant is not particularly limited, and is exemplified, for example, by nonionic surfactants of "OLFIN (trade name)" series produced by Nisshin Chemical Co., Ltd.; nonionic surfactants of "TERGITOL (trade name)" series produced by Dow Chemical Co., Ltd.; nonionic surfactants of "EMULGEN (trade name)" series, "RHEODOL (trade name)" series, "EMASOL (trade name)" series, "EXCEL (trade name)" series, "EMANON (trade name)" series, "AMIET (trade name)" series, "AMINON (trade name)" series, etc. produced by KAO Corporation; nonionic surfactants of "SORBON (trade name)" series produced by Toho Chemical Industry Co., Ltd.; nonionic surfactants of "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, "LEOFAT (trade name)" series, etc., produced by Lion Corporation; anionic surfactants of "EMAL (trade name)" series, "LATEMUL (trade name)" series, "VENOL (trade name)" series, "NEOPELEX (trade name)" series, NS SOAP, KS SOAP, OS SOAP, and "PELEX (trade name)" series, etc., produced by Kao Corporation; anionic surfactants of "LIPOLAN (trade name)" series, "LIPON (trade name)" series, "SUNNOL (trade name)" series, "LIPOTAC (trade name)" series, "TE, ENAGICOL (trade name)" series, "LIPAL (trade name)" series, and "LOTAT (trade name)" series, etc., produced by Lion Corporation; cationic surfactants "KACHIOGEN (trade name) ES-OW" and "KACHIOGEN (trade name) ES-L" produced by Dai-Ichi Kogyo Seiyaku Co., Ltd., etc. It is allowable that only one kind of the surfactant is used singly, or that two or more kinds of the surfactant are used in a mixed manner. The blending amount of the surfactant in the entire amount of the water-based ink is, for example, in a range of 0.1% by weight to 10% by weight, preferably in a range of 0.1% by weight to 8% by weight, and more preferably in a range of 0.1% by weight to 5% by weight.

In the water-based ink, it is preferable that the surfactant includes a nonionic surfactant, and the HLB (Hydrophile-Lipophile Balance) of the nonionic surfactant is in a range of 8 to 12. The present inventors found out that as the hydrophobicity of a nonionic surfactant is greater, namely, as the HLB of the nonionic surfactant is lower, the dynamic surface tension of the water-based ink measured under the condition of lifetime of 50 ms is more lowered, and the occurrence of white streak-like (white line-like) uneven portion (banding) is further suppressed. Therefore, the HLB of the nonionic surfactant is preferably in a range of 8 to 9. The nonionic surfactant of which HLB is in a range of 8 to 12 is preferably a nonionic surfactant having an ethylene oxide group, more preferably an acetylenic glycol-based nonionic surfactant represented by the following formula (1).

(1)

In the formula (1), "m" and "n" may be identical to each other or different from each other, and are numbers satisfying: m+n=1 to 15, preferably satisfying: m+n=3 to 11 and more preferably satisfying: m+n=1 to 6; and in the formula (I), $R^1$, $R^2$, $R^3$ and $R^4$ may be identical to one another or different from one another, and each of $R^1$, $R^2$, $R^3$ and $R^4$ is a straight-chain or branched-chain alkyl group of which carbon atom number is 1 to 5. $R^1$, $R^2$, $R^3$ and $R^4$ are exemplified, for example, by methyl group, ethyl group, propyl group, isopropyl group, butyl group and isobutyl group. Each of $R^1$, $R^2$, $R^3$ and $R^4$ is preferably methyl group or isopropyl group.

The acetylenic glycol-based nonionic surfactant represented by the formula (1) is exemplified, for example, by "OLFIN (trade name) 1004" (HLB=7 to 9), "OLFIN (trade name) 1006" (HLB=11 to 12) which are produced by Nisshin Chemical Co., Ltd.; and the like. In a case that the nonionic surfactant represented by the formula (1) is used, it is possible to obtain a water-based ink in which the occurrence of white streak-like (white line-like) uneven portion (banding) is further suppressed and the image quality is further improved.

The nonionic surfactant may be a nonionic surfactant having, for example, a branched structure represented by the following formula (2). In the formula (2), "x" represents a positive integer which is preferably in a range of 3 to 10, and is particularly preferably 6. The nonionic surfactant represented by the following formula (2) is exemplified, for example, by "TERGITOL (trade name) TMN-6" produced by Dow Chemical Co., Ltd., and the like.

(2)

The blending amount of the nonionic surfactant in the entire amount of the water-based ink is, for example, in a range of 0.2% by weight to 0.6% by weight and preferably in a range of 0.3% by weight to 0.4 by weight.

The nonionic surfactant in the water-based ink is presumed to have a function of lowering the dynamic surface tension of the water-based ink measured under the condition of temperature of 25 degrees Celsius and lifetime of 50 ms, and of suppressing the occurrence of white streak-like uneven portion (banding). Note, however, that a portion or part of the nonionic surfactant adsorbs to a surface of the pigment, and does not contribute to the lowering of the above-described dynamic surface tension. Accordingly, in order to adjust the dynamic surface tension of the water-based ink measured under the condition of temperature of 25 degrees Celsius and lifetime of 50 ms within an appropriate range, it is necessary that the blending amount of the nonionic surfactant is adjusted depending on the blending amount of the pigment in the water-based ink. For example, in the water-based ink, it is preferable that the pigment and the nonionic surfactant represented by the formula (1) are blended so as to satisfy the following condition (I). In a case that the condition (I) is satisfied, it is possible to obtain a water-based ink in which the occurrence of white streak-like uneven portion (banding) is further suppressed and the image quality is further improved.

$$(N1/P) \times 100 \geq 3.3 \qquad \text{Condition (I):}$$

wherein "N1" represents a blending amount (% by weight) of the nonionic surfactant represented by the formula (1) in the entire amount of the water-based ink; and "P" represents a blending amount (% by weight) of the pigment in the entire amount of the water-based ink.

Although the upper limit value of the (N1/P)×100 in the condition (I) is not particular limited, it is preferable that the upper limit value is not more than 7.1. Further, in a case that the pigment is dispersed by using, for example, a polymeric dispersant or the like, it is presumed that the nonionic surfactant also adsorbs to the polymeric dispersant in addition to the pigment. Therefore, by using a self-dispersible pigment not requiring any polymeric dispersant, it is possible to adjust the dynamic surface tension within the appropriate range by a smaller blending amount of the nonionic surfactant, than in the case of dispersing the pigment with the polymeric dispersant or the like. From this viewpoint, the water-based ink of the present teaching preferably satisfies the above-described condition (I) by using a self-dispersible pigment as the pigment.

The water is preferably ion-exchanged water or pure water (purified water). The blending amount of the water in the entire amount of the water-based ink may be, for example, the balance of the other components.

The water-based ink of the present teaching may further contain a water-soluble organic solvent. The water-soluble organic solvent is exemplified, for example, by a humectant which prevents the water-based ink from drying at an end of a nozzle in an ink-jet head, a penetrant which adjusts the drying velocity on a recording medium, etc. In a case that the penetrant is used, it is possible to obtain a water-based ink in which the occurrence of any bleeding is further suppressed and the image quality is further improved.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, 1,2-ethanediol, 1,2-propanediol, 1,2-butanediol, 1,2-pentanediol, 1,2-hexanediol, 1,2,4-butanetriol, 1,2,5-pentanetriol, 1,2,6-hexanetriol, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, it is preferable to use polyvalent alcohols such as alkylene glycol, glycerol, etc.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

In a case that the water-based ink contains glycerol, a blending amount of the glycerol in the entire amount of the water-based ink is, for example, in a range of 8% by weight to 30% by weight, preferably in a range of 10% by weight to 23% by weight, and more preferably in a range of 11% by weight to 23% by weight. Although the nonionic surfactant has a low solubility to water, in a case that the blending amount of the glycerol is within the above-described range, the dissolution of the nonionic surfactant to water is promoted, and the storing stability of the water-based ink is improved. Further, from the viewpoint of promoting the dissolution of the nonionic surfactant to water, a weight ratio (G/N1) of a blending amount (G) of the glycerol to the blending amount (N1) of the nonionic surfactant represented by the formula (1) in the water-based ink is, for example, in a range of (G/N1)=15 to 95, preferably in a range of (G/N1)=20 to 90, and more preferably in a range of (G/N1)=36 to 80.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One type of the penetrant may be used singly, or two or more of the penetrants may be used in combination.

The blending amount of the penetrant in the entire amount of the water-based ink is in a range of 0% by weight to 20% by weight, preferably in a range of 0% by weight to 15% by weight, more preferably in a range of 1% by weight to 4% by weight.

The water-based ink may further contain a conventionally known additive, as necessary. The additive includes, for example, pH-adjusting agents, viscosity-adjusting agents, surface tension-adjusting agents, fungicides, etc. The viscosity-adjusting agents include, for example, polyvinyl alcohol, cellulose, water-soluble resin, etc.

The water-based ink can be prepared, for example, such that the pigment, the surfactant and water, and optionally other additive component(s) are mixed uniformly or homogeneously by any conventionally known method, and undissolved matters are removed by a filter or the like.

As described above, the dynamic surface tension of the water-based ink measured under the condition of temperature of 25 degrees Celsius and lifetime of 10 ms is not less than 35 mN/m; and the dynamic surface tension of the water-based ink measured under the condition of temperature of 25 degrees Celsius and lifetime of 50 ms is not more than 34.5 mN/m. Since each of the dynamic surface tensions measured under the condition of lifetime of 10 ms and the dynamic surface tension measured under the condition of lifetime of 50 ms is within the predetermined range, the increase in viscosity and the solidification due to the drying of the water-based ink are suppressed, any delay in ink discharge hardly occurs, and the image quality is also improved. The dynamic surface tension of the water-based ink measured under the condition of 25 degrees Celsius and lifetime of 10 ms is assumed as dynamic surface tension of the water-based ink when the water-based ink is discharged from a nozzle of an ink-jet head. When the water-based ink is discharged from the nozzle, it is desired that the surface tension of the water-based ink is high to some extent. With this, the water-based ink is capable of forming a stable meniscus inside the nozzle, thereby realizing a stable discharge. The inventors of the present teaching found out that, provided that the dynamic surface tension of the water-based ink measured under the condition of temperature of 25 degrees Celsius and lifetime of 10 ms is not less than 35 mN/m, the stable discharge can be realized. On the other hand, the dynamic surface tension of the water-based ink measured under the condition of 25 degrees Celsius and lifetime of 50 ms is assumed as dynamic surface tension of the water-based ink when the water-based ink lands on a recording medium during any recording. When the water-based ink lands on the recording medium, it is desired that the surface tension of the water-based ink is low to some extent. With this, the water-based ink is capable of spreading on the recording medium, suppressing the occurrence of white streak-like uneven portion (banding), and improving the image quality of an image recorded with the water-based ink on the recording medium. The inventors found out that, provided that the dynamic surface tension of the water-based ink measured under the condition of temperature of 25 degrees Celsius and lifetime of 50 ms is not more than 34.5 mN/m, the image quality is improved. Note that as the lifetime as the measurement condition for measuring the dynamic tension is longer, the alignment or orientation of the surfactant toward the interface of the ink is promoted, which in turn lowers the dynamic surface tension to approach closer to be a value of the static surface tension. Accordingly, the dynamic surface tension of the water-based ink measured under the condition of temperature of 25 degrees Celsius and lifetime of 50 ms becomes smaller (lower) than the dynamic surface tension of the water-based ink measured under the condition of temperature of 25 degrees Celsius and lifetime of 10 ms.

The dynamic surface tension of the water-based ink can be adjusted by, for example, changing the blending amounts of the respective components of the water-based ink. Specifically, it is preferable that the dynamic surface tension of the water-based ink is adjusted, for example, by changing the kinds and blending amounts of the surfactant and the penetrant contained in the water-based ink. As described above, it is allowable that only one kind of the surfactant is used singly, or that two or more kinds of the surfactant are used in a mixed manner; and that only one kind of the penetrant is used singly, or that two or more kinds of the penetrant are used in a mixed manner. In a case that two or more kinds of the surfactant are used, it is preferable that at least one of the two or more surfactants is a nonionic surfactant of which HLB is in a range of 8 to 12. Further, in the case that two or more kinds of the surfactant are used, it is preferable that at least one or two of the two or more surfactant(s) is/are at least one of the above-described acetylenic glycol-based nonionic surfactant represented by the formula (1) and the above-described nonionic surfactant having the branched structure represented by the formula (2). In a case of using the acetylenic glycol-based nonionic surfactant represented by the formula (1) and the nonionic surfactant having the branched structure represented by the formula (2) in combination, a weight ratio (N2/N1) of a blending amount (N2) of the nonionic surfactant epresented by the formula (2) to the blending amount (N1) of the acetylenic glycol-based nonionic surfactant represented by the formula (1) in the water-based ink is preferably in a range of (N2/N1)=0.5 to 2.0. Further, in the case that two or more kinds of the surfactant are used, it is preferable that the blending amount of the nonionic surfactant is greatest in the entire amount of the surfactants. Furthermore, it is preferable that a total content of the nonionic surfactant represented by the formula (1) and the anionic surfactant in the entire amount of the surfactant is in a range of 90% by weight to 100% by weight.

A surfactant used in combination with the nonionic surfactant is preferably an anionic surfactant and another nonionic surfactant of which kind is different from the nonionic surfactant, and is more preferably an anionic surfactant. In a case of using the nonionic surfactant (N) and the anionic surfactant (A) in combination, the weight ratio (N:A) of a blending amount (N) of the nonionic surfactant and a blending amount (A) of the anionic surfactant is not particularly limited; however, the weight ratio (N:A) is, for example, in a range of (N:A)=1:0.28 to 1:0.70. Namely, the weight ratio (A/N) of the blending amount (A) of the anionic surfactant to the blending amount (N) of the nonionic surfactant is, for example, in a range of (A/N)=0.28 to 0.70. Although the nonionic surfactant has a low solubility to water, in a case that the anionic surfactant is added relative to the nonionic surfactant at the above-described weight ratio (A/N), the anionic surfactant promotes the dissolution of the nonionic surfactant to water, and the storing stability of the water-based ink is improved. Further, from the viewpoint of promoting the dissolution of the nonionic surfactant to water, the anionic surfactant preferably has a structure with a hydrophobic group having a size to some extent and a hydrophilic group having a size to some extent, as well. For example, the hydrophobic group of the anionic surfactant is preferably an alkyl group of which carbon atom number is 10 to 18, more preferably alkyl group of which carbon atom number is 12 to 13. The hydrophilic group of the anionic surfactant preferably includes an ethylene oxide chain, more preferably includes an ethylene oxide chain and a sulfate.

The dynamic surface tension of the water-based ink measured under the condition of temperature of 25 degrees Celsius and the lifetime of 10 ms is preferably in a range of 35.5 mN/m to 38 mN/m. In a case that the dynamic surface tension is in the range of 35.5 mN/m to 38 mN/m, it is possible to obtain a water-based ink in which the increase in viscosity and the solidification due to the drying is further suppressed, and the delay in discharge is hardly to occur. Although the lower limit value of the dynamic surface tension of the water-based ink measured under the condition of temperature of 25 degrees Celsius and the lifetime of 50 ms is not particularly limited, the lower limit value is, for example, not less than 25 mN/m, preferably not less than 27 mN/m, more preferably not less than 28 mN/m.

The method for measuring the dynamic surface tension of the water-based ink is exemplified, for example, by the maximum bubble pressure method, the vibration jet method, the meniscus method, etc. Among these methods, the maximum bubble pressure method is preferred.

The measurement of the dynamic surface tension by the maximum bubble pressure method is performed, for example, in the following manner. Namely, a gas is supplied from a gas supply source to a probe (capillary), and the probe is immersed in the water-based ink so that an air bubble is allowed to be generated from an end portion of the probe. In this situation, the flow rate of the gas is changed to thereby change the gas generation speed. The change in pressure applied from the water-based ink to the air babble when the gas generation speed is changed is measured, and the dynamic surface tension is measured by the following formula.

$$\sigma = (\Delta P \times r)/2$$

wherein in the formula:
$\sigma$: dynamic surface tension;
$\Delta P$: difference between the maximum value and the minimum value of the pressure applied to the air bubble; and
$r$: radius of the end portion of the probe.

The pressure applied to the air bubble becomes maximum (maximum bubble pressure) when the radius of curvature of the air bubble takes a value corresponding to (same as) the radius of the end portion of the probe.

Here, the lifetime (bubble lifetime) in the measurement of the dynamic surface tension means a time period from a point of time at which a new interface is formed in the probe, after the air bubble has reached the maximum bubble pressure and has detached from the probe, and until another point of time at which the next maximum bubble pressure is reached.

The measurement of the dynamic surface tension by the maximum bubble pressure method can be performed, for example, by using a dynamic surface tension meter "BP-D4" manufactured by KYOWA INTERFACE SCIENCE, CO., LTD.

The difference obtained by subtracting the dynamic surface tension of the water-based ink measured under the condition of temperature of 25 degrees Celsius and lifetime of 10 ms from the dynamic surface tension of the water-based ink measured under the condition of temperature of 25 degrees Celsius and lifetime of 50 ms is, for example, in a range of 2.0 to 5.0, preferably is in a range of 2.3 to 4.3, and more preferably is in a range of 3.0 to 4.3. By making the difference between these dynamic surface tensions to be within the above range, it is possible to further suppress any delay in discharge of the water-based ink from occurring, and to further improve the image quality.

The static surface tension of the water-based ink is preferably in a range of 26 mN/m to 33 mN/m in view of satisfactorily maintaining the meniscus inside the nozzle of the ink-jet head. The static surface tension can be measured by using, for example, a surface-interface tension meter "CBVP-Z" manufactured by KYOWA INTERFACE SCIENCE, CO., LTD. The measurement temperature for measuring the static surface tension is, for example, 25 degrees Celsius.

As explained above, in the water-based ink for ink-jet recording of the present teaching, each of the dynamic surface tension measured under the condition of temperature of 25 degrees Celsius and the lifetime of 10 ms and the dynamic surface tension measured under the condition of temperature of 25 degrees Celsius and the lifetime of 50 ms is within the predetermined range, and thus in the water-based ink for ink-jet recording, the increase in viscosity and the solidification due to the drying are suppressed, the delay in discharge of the ink hardly occurs, and the image quality is also improved.

Next, an ink cartridge of the present teaching is characterized by being an ink cartridge containing a water-based ink for ink-jet recording; wherein the water-based ink is the water-based ink for ink-jet recording of the present teaching. For example, any conventionally known main body (body) of an ink cartridge can be used for the main body of the ink cartridge of the present teaching.

Next, explanation will be given about an ink-jet recording apparatus and an ink-jet recording method of the present teaching.

The ink-jet recording apparatus of the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink.

The ink-jet recording method of the present teaching can be practiced, for example, by using the ink-jet recording apparatus of the present teaching. The recording includes printing a letter (text), printing an image, printing, etc.

FIGURE depicts the configuration of an example of the ink-jet recording apparatus of the present teaching. As depicted in FIGURE, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts.

The ink discharge mechanism (ink-jet head) 3 is preferably an ink-jet head of a piezoelectric system. In particular, with respect to a water-based ink with a high blending amount of the pigment (solid content amount of the pigment), for example, with respect to such a water-based ink in which the solid content amount of the pigment is in a range of 7% by weight to 9% by weight, there is such a fear that any burning, etc., might occur when such a water-based ink is discharged by using an ink-jet head of a thermal system. On the other hand, such a water-based ink can be stably discharged by using an ink-jet head of a piezoelectric system. Further, the ink discharge mechanism (ink-jet head) 3 has a plurality of nozzles which are formed therein and via which the water-based ink is discharged, and the inner diameter of the nozzles is, for example, in a range of 10 μm to 30 μm, preferably in a range of 13 μm to 21 μm. Inside the nozzles of which inner diameter is within the above range, the water-based ink of the present teaching having the dynamic surface tension within the specific range is capable of forming a stable meniscus when the water-based ink is discharged. As a result, the water-based ink can be discharged stably, and any delay in the discharge of ink can be suppressed.

The four ink cartridges 2 contain four colors of water-based inks, respectively, the four colors being yellow, magenta, cyan and black. At least one water-based ink among the four color water-based inks is the water-based ink for ink-jet recording of the present teaching. The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIGURE, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four cartridges 2 may be provided on a carriage which is different (separate) from the carriage on which the head unit 4 is provided. Alternatively, the respective four cartridges 2 may be arranged and fixed inside the ink-jet recording apparatus 1, rather than being provided on the carriage 5. In such aspects, for example, each of the four cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed, for example, from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. In the water-based ink of the present teaching, the increase in viscosity and the solidification due to the drying is suppressed, and any delay in the discharge of ink hardly occurs. The recording paper P after the recording is discharged from the ink-jet recording apparatus 1. According to the water-based ink of the present teaching, it is possible to obtain a recorded matter with an improved image quality. In FIGURE, the paper feeding mechanism and paper discharge mechanism for the recording paper P are omitted in the drawing.

In the apparatus depicted in FIGURE, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and is not restricted to the examples and the comparative examples which will be described below.

Examples 1 to 18 and Comparative Examples 1 to 9

Components, except for the self-dispersible pigment, which were included in Ink Composition (TABLE 1) as indicated below were mixed uniformly or homogeneously; and thus an ink solvent was obtained. Subsequently, the ink solvent was added to the self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus a water-based ink for ink-jet recording of each of Examples 1 to 18 and Comparative Examples 1 to 9 was obtained. Note that in TABLE 1, "CAB-O-JET (trade name) 300" is a dispersion of self-dispersible carbon black modified by a carboxyl group.

With respect to the water-based inks of Examples 1 to 18 and Comparative Examples 1 to 9, (a) image quality: measurement of optical density (OD value), (b) image quality: evaluation of white streak-like uneven portion (banding), and (c) evaluation of delay in ink discharge were performed by the following methods. Note that samples used for (a) image quality: measurement of optical density (OD value) and for (b) image quality: evaluation of white streak-like uneven portion (banding) were prepared by the following methods.

<Preparation of Evaluation Samples>

An ink-jet printer "MFC-J4510N" manufactured by BROTHER KOGYO KABUSHIKI KAISHA was used to record an image including a single-black color patch on a plain paper (plain paper "4200" produced by XEROX CORPORATION), under the conditions with a resolution of 600 dpi×300 dpi, by using each of the water-based inks of Examples 1 to 18 and Comparative Examples 1 to 9. Thus, evaluation samples were produced.

(a) Image Quality: Measurement of Optical Density (OD Value)

The optical densities (OD values) of each of the evaluation samples at five locations (five portions) of each evaluation sample were measured by using a spectrophotometric colorimetry meter "SpectroEye" manufactured by X-Rite Inc., and the average value of the optical densities (OD values) of each of the samples was obtained.

(b) Image Quality: Evaluation Regarding White Streak-Like Uneven Portion (Banding)

Each of the evaluation samples was observed and evaluated regarding the white streak-like uneven portion (banding) based on the following evaluation criterion.

<Evaluation Criterion for Evaluation Regarding White Streak-Like Uneven Portion (Banding)>

A: No white streak-like uneven portion (banding) was observed in an observation using a 60× magnifying glass.

B: No white streak-like uneven portion (banding) was observed in a visual observation.

C: White streak-like uneven portion (banding) was observed in the visual observation.

(c) Evaluation Regarding Delay in Ink Discharge

The ink-jet printer "MFC-J4510N" manufactured by BROTHER KOGYO KABUSHIKI KAISHA was used to record ruled lines on exclusive paper (high quality plain paper "BP60PA" produced by BROTHER KOGYO KABUSHIKI KAISHA), under the conditions with a resolution of 600 dpi×300 dpi, by using each of the water-based inks of Examples 1 to 18 and Comparative Examples 1 to 9. Thus, evaluation samples were produced. Each of the evaluation samples was observed and evaluated regarding the delay in ink discharge based on the following evaluation criterion.

<Evaluation Criterion for Evaluation Regarding Delay in Ink Discharge>

A: No delay in ink discharge was observed in an observation using a 50× microscope.

B: No delay in ink discharge was observed in a visual observation.

C: Delay in ink discharge was observed in the visual observation.

The composition, the dynamic surface tension, and the results of measurement and evaluation of each of the water-based inks of Examples 1 to 18 and Comparative Examples 1 to 9 are indicated in TABLE 1 as follows. Note that in TABLE 1, the dynamic surface tension of each of the water-based inks was measured by the maximum bubble pressure method using a dynamic surface tension meter "BP-D4" manufactured by KYOWA INTERFACE SCIENCE, CO., LTD., under a condition of temperature of 25 degrees Celsius and lifetime in a range of 20 ms to 5,000 ms. Regarding the lifetime of 10 ms as the measurement condition of the dynamic surface tension, the dynamic surface tension was calculated by performing extrapolation with the polynomial approximation from the results of the above-described measurements performed under the condition of the lifetime in the range of 20 mn to 5,0000 ms. Note that in TABLE 1, values of N1/P×100 in the condition (I) are also indicated. Example 15 and Comparative Example 7 did not contain the nonionic surfactant represented by the formula (1). In Example 15 and Comparative Example 7, values of N/P×100 are indicated in parentheses, instead of the values N1/P×100. Here, "N" represents a blending amount of the nonionic surfactant.

TABLE 1

| | | | EXAMPLES | | | | | | | | |
|---|---|---|---|---|---|---|---|---|---|---|---|
| | | | 1 | 2 | 3 | 4 | 5 | 6 | 7 | 8 | 9 |
| Composition of water-based ink (% by weight) | CAB-O-JET (trade name) 300 (*1) | P (% by weight.) | 53.33 (8.00) | 40.00 (6.00) | 46.67 (7.00) | 60.00 (9.00) | 53.33 (8.00) | 53.33 (8.00) | 53.33 (8.00) | 53.33 (8.00) | 46.67 (7.00) |
| | Glycerol | | 15.00 | 21.00 | 20.00 | 11.00 | 18.00 | 23.00 | 15.00 | 20.00 | 18.00 |
| | Triethylene glycol | | 4.00 | 4.00 | 4.00 | 4.00 | 4.00 | 4.00 | 4.00 | 4.00 | 4.00 |
| | 1,2-hexanediol | | — | — | — | — | — | — | — | — | — |
| | Triethylene glycol-n-butyl ether | | 4.00 | 4.00 | 4.00 | 2.00 | 2.00 | 6.00 | 2.00 | — | 4.00 |

TABLE 1-continued

|  |  |  |  |  |  |  |  |  |  |  |
|---|---|---|---|---|---|---|---|---|---|---|
| Propylene glycol methyl ether | | | — | — | — | — | — | — | 2.00 | — | — |
| SUNNOL (trade name) NL-1430 (*2) | | | 0.50 (0.14) | 0.50 (0.14) | 0.50 (0.14) | 0.50 (0.14) | 0.50 (0.14) | 0.50 (0.14) | 0.50 (0.14) | 0.50 (0.14) | 0.50 (0.14) |
| OLFIN (trade name) E1004 (*3) | N1 (% by weight.) | | 0.30 | 0.30 | 0.30 | 0.30 | 0.30 | 0.30 | 0.30 | 0.30 | 0.20 |
| OLFIN (trade name) E1006 (*4) | | | — | — | — | — | — | — | — | — | — |
| OLFIN (trade name) E1010 (*6) | | | — | — | — | — | — | — | — | — | — |
| TERGITOL (trade name) TMN-6 (*5) | | | — | — | — | — | — | — | — | — | — |
| EMULGEN (trade name) 109 P (*7) | | | — | — | — | — | — | — | — | — | — |
| Water | | | balance | balance | balance | balance | balance | balance | balance | balance | balance |
| (N1/P) × 100 | | | 3.8 | 5.0 | 4.3 | 3.3 | 3.8 | 3.8 | 3.8 | 3.8 | 2.9 |
| Dynamic surface tension (mN/m) | | 10 ms | 36.0 | 37.3 | 36.5 | 37.8 | 37.6 | 37.7 | 37.5 | 36.9 | 37.8 |
|  |  | 50 ms | 32.6 | 33.4 | 32.8 | 33.8 | 33.4 | 33.8 | 33.3 | 32.8 | 34.1 |
| Image quality: optical density (OD value) | | | 1.29 | 1.20 | 1.24 | 1.31 | 1.28 | 1.29 | 1.27 | 1.28 | 1.23 |
| Image quality: white streak-like uneven portion (banding) | | | A | A | A | A | A | A | A | A | B |
| Delay in ink discharge | | | A | A | A | A | A | A | A | A | A |

|  |  |  | EXAMPLES | | | | | | | | |
|---|---|---|---|---|---|---|---|---|---|---|---|
|  |  |  | 10 | 11 | 12 | 13 | 14 | 15 | 16 | 17 | 18 |
| Composition of water-based ink (% by weight) | CAB-O-JET (trade name) 300 (*1) | P (% by weight.) | 60.00 (9.00) | 53.33 (8.00) | 46.67 (7.00) | 60.00 (9.00) | 53.33 (8.00) | 53.33 (8.00) | 53.33 (8.00) | 53.33 (8.00) | 53.33 (8.00) |
|  | Glycerol | | 10.00 | 15.00 | 18.00 | 10.00 | 15.00 | 15.00 | 14.00 | 11.00 | 20.00 |
|  | Triethylene glycol | | 4.00 | 4.00 | 4.00 | 4.00 | 4.00 | 4.00 | 4.00 | 4.00 | — |
|  | 1,2-hexanediol | | — | — | — | — | — | — | — | 2.00 | — |
|  | Triethylene glycol-n-butyl ether | | 4.00 | 4.00 | 4.00 | 4.00 | 4.00 | 4.00 | 4.00 | 4.00 | 4.00 |
|  | Propylene glycol methyl ether | | — | — | — | — | — | — | — | — | — |
|  | SUNNOL (trade name) NL-1430 (*2) | | 0.50 (0.14) | 0.50 (0.14) | 0.50 (0.14) | 0.50 (0.14) | 0.50 (0.14) | 0.50 (0.14) | 0.50 (0.14) | 0.50 (0.14) | 0.50 (0.14) |
|  | OLFIN (trade name) E1004 (*3) | N1 (% by weight.) | 0.20 | 0.40 | 0.50 | 0.50 | — | — | 0.20 | 0.30 | 0.30 |
|  | OLFIN (trade name) E1006 (*4) | | — | — | — | — | 0.30 | — | — | — | — |
|  | OLFIN (trade name) E1010 (*6) | | — | — | — | — | — | — | — | — | — |
|  | TERGITOL (trade name) TMN-6 (*5) | | — | — | — | — | — | 0.44 (0.40) | 0.22 (0.20) | — | — |
|  | EMULGEN (trade name) 109 P (*7) | | — | — | — | — | — | — | — | — | — |
|  | Water | | balance | balance | balance | balance | balance | balance | balance | balance | balance |
| (N1/P) × 100 | | | 2.2 | 5.0 | 7.1 | 5.6 | 3.8 | (5.0) | 2.5 | 3.8 | 3.8 |
| Dynamic surface tension (mN/m) | | 10 ms | 37.7 | 35.6 | 35.4 | 35.3 | 37.1 | 38.0 | 36.8 | 35.2 | 37.1 |
|  |  | 50 ms | 34.5 | 32.0 | 31.5 | 31.4 | 33.2 | 34.3 | 33.1 | 32.9 | 32.8 |
| Image quality: optical density (OD value) | | | 1.28 | 1.30 | 1.26 | 1.33 | 1.27 | 1.27 | 1.29 | 1.32 | 1.29 |
| Image quality: white streak-like uneven portion (banding) | | | B | A | A | A | A | B | A | A | A |
| Delay in ink discharge | | | A | A | B | B | A | A | A | B | A |

|  |  |  | COMPARATIVE EXAMPLES | | | | | | | | |
|---|---|---|---|---|---|---|---|---|---|---|---|
|  |  |  | 1 | 2 | 3 | 4 | 5 | 6 | 7 | 8 | 9 |
| Composition of water-based ink (% by weight) | CAB-O-JET (trade name) 300 (*1) | P (% by weight.) | 53.33 (8.00) | 53.33 (8.00) | 53.33 (8.00) | 53.33 (8.00) | 53.33 (8.00) | 53.33 (8.00) | 53.33 (8.00) | 53.33 (8.00) | 53.33 (8.00) |
|  | Glycerol | | 20.00 | 16.00 | 16.00 | 14.00 | 15.00 | 14.00 | 12.00 | 12.00 | 10.00 |
|  | Triethylene glycol | | 4.00 | 4.00 | 4.00 | 4.00 | 4.00 | 4.00 | 4.00 | 4.00 | 4.00 |
|  | 1,2-hexanediol | | — | — | — | — | — | — | — | 5.00 | 5.00 |
|  | Triethylene glycol-n-butyl ether | | — | 4.00 | 4.00 | 4.00 | 4.00 | 4.00 | 4.00 | — | 4.00 |
|  | Propylene glycol methyl ether | | — | — | — | — | — | — | — | — | — |
|  | SUNNOL (trade name) NL-1430 (*2) | | 0.50 (0.14) | 0.50 (0.14) | 0.50 (0.14) | 0.50 (0.14) | 0.50 (0.14) | 0.50 (0.14) | 0.50 (0.14) | 0.50 (0.14) | 0.50 (0.14) |
|  | OLFIN (trade name) E1004 (*3) | N1 (% by weight.) | — | — | 0.10 | 0.70 | — | — | — | 0.30 | 0.30 |
|  | OLFIN (trade name) E1006 (*4) | | — | — | — | — | — | — | — | — | — |
|  | OLFIN (trade name) E1010 (*6) | | — | — | — | — | 0.30 | 0.50 | — | — | — |
|  | TERGITOL (trade name) TMN-6 (*5) | | — | — | — | — | — | — | — | — | — |
|  | EMULGEN (trade name) 109 P (*7) | | — | — | — | — | — | — | 1.00 | — | — |
|  | Water | | balance | balance | balance | balance | balance | balance | balance | balance | balance |
| (N1/P) × 100 | | | — | — | 1.3 | 8.8 | 3.8 | 6.3 | (12.5) | 3.8 | 3.8 |
| Dynamic surface tension (mN/m) | | 10 ms | 59.2 | 44.2 | 39.0 | 34.3 | 40.5 | 39.0 | 42.5 | 32.4 | 34.7 |
|  |  | 50 ms | 38.0 | 41.0 | 36.0 | 30.8 | 36.9 | 35.6 | 38.5 | 29.8 | 32.1 |

TABLE 1-continued

| Image quality: optical density (OD value) | 1.06 | 1.16 | 1.25 | 1.31 | 1.26 | 1.28 | 1.17 | 1.33 | 1.34 |
|---|---|---|---|---|---|---|---|---|---|
| Image quality: white streak-like uneven portion (banding) | C | C | C | A | C | C | C | A | A |
| Delay in ink discharge | A | A | A | C | A | A | C | C | C |

LEGEND
(*1): Self-dispersible black pigment; produced by Cabot Specialty Chemicals, Inc.; pigment solid content amount): 15% by weight; numerals in parentheses indicate pigment solid content amount.
(*2): Anionic surfactant, sodium polyoxyethylene alkyl (C = 12, 13) ether sulfate; produced by Lion Corporation; active ingredient amount = 28% by weight; numeral in parentheses indicate active ingredient amounts.
(*3): Nonionic surfactant represented by the formula (1); produced by Nisshin Chemical Co., Ltd.; active ingredient amount = 100% by weight; HLB = 7 to 9.
(*4): Nonionic surfactant represented by the formula (1); produced by Nisshin Chemical Co., Ltd.; active ingredient amount = 100% by weight; HLB = 11 to 12.
(*5): Nonionic surfactant; produced by Dow Chemical Co., Ltd.; active ingredient amount = 90% by weight; numeral in parentheses indicate active ingredient amounts.
(*6): Nonionic surfactant represented by the formula (1); produced by Nisshin Chemical Co., Ltd.; active ingredient amount = 100% by weight; HLB = 13 to 14.
(*7): Nonionic surfactant; produced by Kao Corporation; active ingredient amount = 100% by weight.

As indicated in TABLE 1, Examples 1 to 18 had satisfactory results of evaluations regarding the image quality and the delay in ink discharge. Particularly in Examples 1 to 8, 11 to 14, 17 and 18 in each of which the nonionic surfactant represented by the formula (1) was used and in which (N1/P)×100≥3.3, the result of evaluation regarding the white streak-like uneven portion (banding) was particularly excellent. Further, in Examples 1 to 11, 14 to 16 and 18 in each of which the dynamic surface tension at the lifetime of 10 ms was in a range of 35.5 mN/m to 38.0 mN/m, the result of evaluation regarding the delay in ink discharge was particularly excellent.

On the other hand, in Comparative Examples 1 to 3, 5 and 6 in each of which the dynamic surface tension at the lifetime of 50 ms exceeded 34.5 mN/m, the result of evaluation regarding the white streak-like uneven portion (banding) was unsatisfactory. Further, in comparative Example 7 in which the dynamic surface tension at the lifetime of 50 ms exceeded 34.5 mN/m, the result of evaluation regarding the white streak-like uneven portion (banding) was unsatisfactory and the result of evaluation regarding the delay in ink discharge was unsatisfactory. Furthermore, in comparative Examples 4, 8 and 9 in each of which the dynamic surface tension at the lifetime of 10 ms was less than 35 mN/m, the result of evaluation regarding the delay in ink discharge was unsatisfactory.

Further, by comparing Comparative Example 3 and Comparative Example 4, it is appreciated that in Comparative Example 3, the blending amount (N1) of the nonionic surfactant represented by the formula (1) was 0.10% by weight which was small, and in Comparative Example 4, the blending amount (N1) of the nonionic surfactant represented by the formula (1) was 0.70% by weight which was large. In Comparative Example 3, the small blending amount of the nonionic surfactant represented by the formula (1) is presumed as a main factor for resulting in having a high dynamic surface tension measured under the condition of temperature of 25 degrees Celsius and lifetime of 50 ms and resulting in an unsatisfactory result in the evaluation regarding white streak-like uneven portion (banding). In Comparative Example 4, the large blending amount of the nonionic surfactant represented by the formula (1) is presumed as a main factor for resulting in having a low dynamic surface tension measured under the condition of temperature of 25 degrees Celsius and lifetime of 50 ms and resulting in an unsatisfactory result in the evaluation regarding delay in ink discharge. In contrast, in Examples 1 to 18, the blending amount of the nonionic surfactant in the water-based ink was in the range of 0.2% by weight to 0.6% by weight. From these results, it is presumed that the blending amount of the nonionic surfactant in the water-based ink is preferably in the range of 0.2% by weight to 0.6% by weight.

Further, in each of Comparative Example 5 and Comparative Example 6, although the nonionic surfactant represented by the formula (1) was used and (N1/P)×100≥3.3, the dynamic surface tension measured under the condition of temperature of 25 degrees Celsius and lifetime of 50 ms was high and the result of evaluation regarding the white streak-like uneven portion (banding) was unsatisfactory. In Comparative Example 5 and Comparative Example 6, high HLB (HLB=13 to 14) is presumed as a main factor for resulting in having the high dynamic surface tension measured under the condition of temperature of 25 degrees Celsius and lifetime of 50 ms and resulting in the unsatisfactory result in the evaluation regarding white streak-like uneven portion (banding).

As described above, in the water-based ink of the present teaching, the increase in the viscosity and the solidification due to drying of the water-based ink are suppressed, the delay in discharge of the ink hardly occurs, and the image quality is also improved. The usage of the water-based ink of the present teaching is not particularly limited, and is widely applicable to a variety of kinds of ink-jet recording.

What is claimed is:

1. A water-based ink for ink-jet recording comprising:
a pigment;
a nonionic surfactant;
an anionic surfactant; and
water,
wherein dynamic surface tension of the water-based ink measured under a condition of temperature of 25 degrees Celsius and lifetime of 10 ms is not less than 35 mN/m; dynamic surface tension of the water-based ink measured under a condition of temperature of 25 degrees Celsius and lifetime of 50 ms is not more than 34.5 mN/m; and
a weight ratio (A/N) of a blending amount (A) of the anionic surfactant to a blending amount (N) of the nonionic surfactant in the water-based ink is in a range of 0.28 to 0.70.

2. The water-based ink for ink-jet recording according to claim 1, wherein the dynamic surface tension of the water-based ink measured under the condition of temperature of 25 degrees Celsius and lifetime of 10 ms is in a range of 35.5 mN/m to 38 mN/m.

3. The water-based ink for ink-jet recording according to claim 1, wherein the surfactant is a nonionic surfactant, and HLB of the nonionic surfactant is in a range of 8 to 12.

4. The water-based ink for ink-jet recording according to claim 1, wherein the surfactant is a nonionic surfactant, and HLB of the nonionic surfactant is in a range of 8 to 9.

5. The water-based ink for ink-jet recording according to claim 1, wherein the surfactant is an acetylenic glycol-based nonionic surfactant.

6. The water-based ink for ink-jet recording according to claim 1, wherein the surfactant is an acetylenic glycol-based nonionic surfactant represented by the following formula (1):

in the formula (1), "m" and "n" are identical to each other, and are numbers satisfying: m+n=1 to 15; and
$R^1$, $R^2$, $R^3$ and $R^4$ are identical to one another or different from one another, and each of $R^1$, $R^2$, $R^3$ and $R^4$ is a straight-chain or branched-chain alkyl group of which carbon atom number is 1 to 5.

7. The water-based ink for ink-jet recording according to claim 6, wherein in the formula (1), the "m" and "n" are numbers satisfying: m+n=1 to 6.

8. The water-based ink for ink-jet recording according to claim 6, wherein the pigment and the acetylenic glycol-based nonionic surfactant represented by the formula (1) are blended in the water-based ink so as to satisfy the following condition (I):

$$(N1/P) \times 100 \geq 3.3 \quad \text{condition (I):}$$

in the condition (I),
N1 represents a blending amount (% by weight) of the acetylenic glycol-based nonionic surfactant represented by the formula (1) in an entire amount of the water-based ink; and
P represents a blending amount (% by weight) of the pigment in the entire amount of the water-based ink.

9. The water-based ink for ink-jet recording according to claim 1, wherein the surfactant is a nonionic surfactant represented by the following formula (2):

in the formula (2), "x" is a positive integer in a range of 3 to 10.

10. The water-based ink for ink-jet recording according to claim 6, wherein a content of the acetylenic glycol-based nonionic surfactant represented by the formula (1) in the water-based ink is in a range of 0.2% by weight to 0.6% by weight.

11. The water-based ink for ink-jet recording according to claim 1, further comprising glycerol, and a content of the glycerol in the water-based ink is in a range of 8% by weight to 30% by weight.

12. The water-based ink for ink-jet recording according to claim 6, further comprising glycerol;
wherein a weight ratio (G/N1) of a blending amount (G) of the glycerol to a blending amount (N1) of the acetylenic glycol-based nonionic surfactant represented by the formula (1) in the water-based ink is in a range of 15 to 95.

13. The water-based ink for ink-jet recording according to claim 1, wherein a difference obtained by subtracting the dynamic surface tension of the water-based ink measured under the condition of temperature of 25 degrees Celsius and lifetime of 10 ms from the dynamic surface tension of the water-based ink measured under the condition of temperature of 25 degrees Celsius and lifetime of 50 ms is in a range of 2.0 to 5.0.

14. The water-based ink for ink-jet recording according to claim 1, wherein the pigment is a self-dispersible pigment.

15. The water-based ink for ink-jet recording according to claim 1, wherein the pigment is a self-dispersible pigment modified by a carboxyl group.

16. The water-based ink for ink-jet recording according to claim 1, wherein a content of the pigment in the water-based ink is not less than 7% by weight.

17. An ink-jet recording method comprising:
preparing a water-based ink for ink-jet recording which contains a pigment, a nonionic surfactant, anionic surfactant, and water, wherein dynamic surface tension of the water-based ink measured under a condition of temperature of 25 degrees Celsius and lifetime of 10 ms is not less than 35 mN/m, and dynamic surface tension of the water-based ink measured under a condition of temperature of 25 degrees Celsius and lifetime of 50 ms is not more than 34.5 mN/m, and a weight ratio (A/N) of a blending amount (A) of the anionic surfactant to a blending amount (N) of the nonionic surfactant in the water-based ink is in a range of 0.28 to 0.70; and
discharging, to a recording medium, the water-based ink by an ink-jet system.

18. The ink-jet recording method according to claim 17, wherein an ink-jet head of a piezoelectric system is used to discharge the water-based ink onto the recording medium.

19. The ink-jet recording method according to claim 17, wherein an ink-jet head, having a plurality of nozzles which are formed in the ink-jet head and of which inner diameter is in a range of 10 μm to 30 μm, is used to discharge the water-based ink from the plurality of nozzles onto the recording medium.

20. The water-based ink for ink-jet recording according to claim 2, wherein dynamic surface tension of the water-based ink measured under a condition of temperature of 25 degrees Celsius and lifetime of 50 ms is in a range of 32.0 mN/m to 33.8 mN/m.

21. The water-based ink for ink-jet recording according to claim 2, wherein dynamic surface tension of the water-based ink measured under a condition of temperature of 25 degrees Celsius and lifetime of 50 ms is in a range of 31.4 mN/m to 33.8 mN/m.

* * * * *

UNITED STATES PATENT AND TRADEMARK OFFICE
CERTIFICATE OF CORRECTION

PATENT NO. : 9,752,038 B2
APPLICATION NO. : 14/867747
DATED : September 5, 2017
INVENTOR(S) : Yuki Okumura et al.

Page 1 of 1

It is certified that error appears in the above-identified patent and that said Letters Patent is hereby corrected as shown below:

In Column 19, Claim 6, Line 18:
After "identical to each other" insert --or different from each other--

Signed and Sealed this
Twenty-third Day of January, 2018

Joseph Matal
*Performing the Functions and Duties of the
Under Secretary of Commerce for Intellectual Property and
Director of the United States Patent and Trademark Office*